May 26, 1931.  A. W. F. MANZEL  1,807,422

SHOCK ABSORBER

Filed Feb. 19, 1927    2 Sheets-Sheet 1

Adolph W. F. Manzel, Inventor.

Witness:
J. J. Oberst.

By Emil Keuhart
Attorney.

May 26, 1931.  A. W. F. MANZEL  1,807,422
SHOCK ABSORBER
Filed Feb. 19, 1927    2 Sheets-Sheet 2

Adolph W. F. Manzel, Inventor.
By Emil Kubart
Attorney.

Witness:
J. J. Oberst.

Patented May 26, 1931

1,807,422

UNITED STATES PATENT OFFICE

ADOLPH W. F. MANZEL, OF BUFFALO, NEW YORK, ASSIGNOR TO MANZEL BROS. CO., OF BUFFALO, NEW YORK, A CORPORATION OF NEW YORK

SHOCK ABSORBER

Application filed February 19, 1927. Serial No. 169,535.

My invention relates to shock absorbers for cushioning the movement of two relatively movable members, and more particularly to that type of shock absorber in which oil or some other suitable fluid controls the action of each of said relatively movable members in one direction while a spring of suitable power governs the relative movement of each of said members in an opposite direction; the invention being especially designed for use on automobiles or other vehicles and adapted to check the rebound of the vehicle body when the vehicle passes into a rut or over a projection in the road.

The primary object of my invention is to provide a shock absorber in which provision is made for more effectively resisting the shocks to which the automobile is subjected when passing over rough roads, and to control the flow of the resisting fluid within the shock absorbers in a more effective manner than has heretofore been possible.

A further object of my invention is to provide a shock absorber in which the fluid control mechanism is constructed so as to guard against the clogging of oil passages within the casing of the shock absorbers and to simplify the construction of shock absorbers of this type.

In the drawings:

Fig. 3 is a horizontal section taken on line 3—3, Fig. 2.

Fig. 4 is an enlarged transverse section taken on line 4—4, Fig. 2, looking in the direction of the arrow crossing said line.

Fig. 5 is an enlarged transverse section taken on line 5—5, Fig. 2, looking in the direction of the arrow crossing said line.

Fig. 6 is an enlarged horizontal section taken on line 6—6, Fig. 2.

Fig. 7 is a detached perspective view of the adjustable control valve whereby the passage of oil or other fluid being used in the shock absorber from one chamber to the other, is controlled.

Fig. 8 is a detached perspective view of the guide sleeve co-acting with said control valve.

Fig. 9 is a detached perspective view of the relief valve.

Fig. 10 is a detached perspective view of the combined relief valve guide and seat.

Fig. 11 is a vertical longitudinal section of the lower end of a shock absorber, showing a slightly modified form of my invention.

Fig. 12 is an enlarged transverse vertical section taken on line 12—12, Fig. 11.

Fig. 13 is a cross section through the relief valve stem shown in Figs. 11 and 12.

Fig. 14 is a detached perspective view of the relief valve shown in Figs. 11 and 12.

Figure 1:
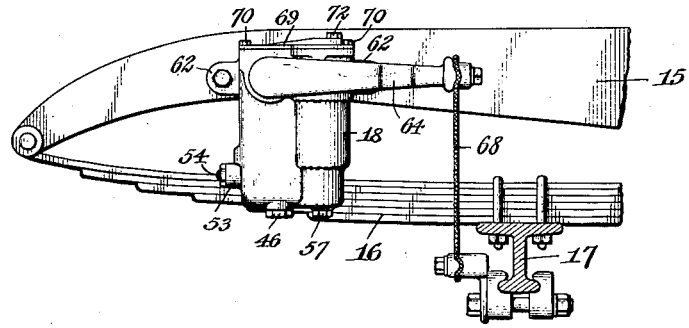
Fig. 1 is a sectional elevation of a portion of a car showing the manner of applying this improved shock absorber thereto.

In Fig. 1, I have shown the parts of an automobile to which one of my improved shock absorbers is shown applied, and as illustrated these parts are at the front of the automobile. It is, however, to be understood that a shock absorber is provided at each side of the automobile or other vehicle, and that a pair of shock absorbers may be used at the front or at the rear, or both at the front and the rear of the automobile.

The reference numeral 15 designates the frame or chassis of an automobile and 16 one of the leaf springs fastened at opposite ends to said frame or chassis in the usual manner, and between its ends to an axle 17, which is shown in cross section in Fig. 1.

When passing into a rut in the road the leaf spring becomes flexed, opposite ends of the spring being forced closer to the road surface under spring pressure, with the result that the body of the automobile connected to the ends of the spring is drawn downwardly. The tendency of the spring to recover after passing over the rough portion or portions of the road will cause a violent upthrow of the body of the automobile, particularly when traveling at a high rate of speed, and thus causing undue strain on the spring. The body or the chassis and the spring or the axle may be considered as two relatively movable parts, to one of which the housing or casing of the shock absorber is secured, and to the other an element extending from said housing or casing and adapted to actuate parts within said casing to which said extending element is connected.

The housing or casing of the shock absorber is designated by the numeral 18, and it is divided into two chambers 19, 20, by a wall 21, one side of which is curved transversely to form part of the chamber 19, which is cylindrical and serves as a plunger cylinder. The chamber 20 may be of any desired formation in cross section.

The wall 21 is thickened along a portion of its length to provide a control chamber 22, the lower end of which is spaced from the bottom of the chamber 20 and the upper end arranged in a plane a considerable distance beneath the upper end of the wall 21. Arranged vertically in this control chamber is a vertical passage 23, which is screw-threaded along its length at two points and of different diameters, and connecting this vertical passage 23 with the cylinder 19 is an oil passage or port 24 with which is axially alined a screw-threaded opening 25 extending from the exterior of the control chamber to the vertical passage 23. This vertical passage has its greatest diameter at its lower end so as to form a main valve chamber 26 which extends from a point at least in line with the highest point of the passage 24 to the lower end of the control chamber 22. The lower end of the vertical passage 23 is screw-threaded, as at 27, and has screwed thereinto a valve seat in the form of a sleeve nut 28, the upper end of the passage through said sleeve nut, or valve seat, being flared, as at 29.

From the upper end of the main valve chamber 26 the vertical passage is reduced in diameter upwardly to form a relief valve chamber 30, the lower end of which is screw-threaded and has threaded thereinto a valve stem guide 31 in the form of a sleeve provided at its lower end with an outwardly-extending flange 32 adapted to bear against the top wall of the main valve chamber 26 when said guide sleeve is threaded upwardly into the relief valve chamber 30 to its full extent.

At the lower end of the guide 31, or guide sleeve as it may be termed, an annular depending flange 33 is arranged around which the upper end of a compression spring 34 is placed, said spring being interposed between said guide sleeve and a spherical or ball valve 35 seated against the flared portion 29 of the valve seat 28. The valve seat 28 is provided with an outstanding flange 36 at its lower end which bears against the under side of the control chamber 22. The flange 36 of said valve seat and the flange 32 of the guide sleeve 31 prevent leakage of oil along the parts from which they extend, and the compression spring 34 bears at its upper end against the flange 32 of said guide sleeve 31 and at its lower end against the spherical ball valve 35, exerting its pressure against said valve seat to keep the valve seated against the flared portion of the valve seat 28, thus closing the lower end of the control chamber.

Arranged in the relief chamber 30 is a relief valve 38, which has a cylindrical body and an outstanding flange 39 on said body a short distance from its upper end, the portion of the body beneath said flange being slidable within the valve stem guide sleeve 31 and the flange 39 being seated upon the upper end of said sleeve. That portion of the cylindrical body of said valve extending above the flange 39 is surrounded by the lower end of a compression spring 40, said end bearing against the flange 39 and keeping the latter seated firmly against the upper end of the valve stem guide sleeve 31, while the upper end of said spring bears against a shoulder 41 formed in the vertical passage 23 by reducing the upper end thereof. The outstanding flange 39 is notched, preferably at diametrically opposite points, as at 42, the notches so provided serving as oil passages when the relief valve 38 rises from its seat.

The valve stem guide sleeve 31 is slotted longitudinally, as at 43, the slots extending from the upper end of said sleeve downwardly a distance somewhat less than the length of the body portion of the relief valve from its flange 39 to its lower end, so that when the valve is depressed by the spring 40, the body portion of said valve will completely cover the slots 43 of said guide sleeve, thus preventing the escape of any oil upwardly through the control chamber, except under pressure sufficient to compress the spring 40, which will allow the valve 38 to rise and uncover portions of the slots 43. These slots serve as oil passages and the degree to which they are uncovered will be in accordance with the pressure of the oil exerted against the lower end of the relief valve within the valve stem guide sleeve. This, of course, will also result in the flange 39 being lifted out of contact with the upper end of said valve stem guide sleeve so that the oil escaping upwardly through the slots or passages 43 will enter the space between the upper end of said guide sleeve and said flange 39, and escape through the notches or passages 42 in said flange, this oil finally passing upwardly through and around the spring 40 and out the reduced upper end of the vertical passage in the control chamber 22. Such displacement of the relief valve will, however, not be allowed until other parts of the device, to be presently described, have reached their functioning limit or become accidentally defective in operation.

Figure 2:
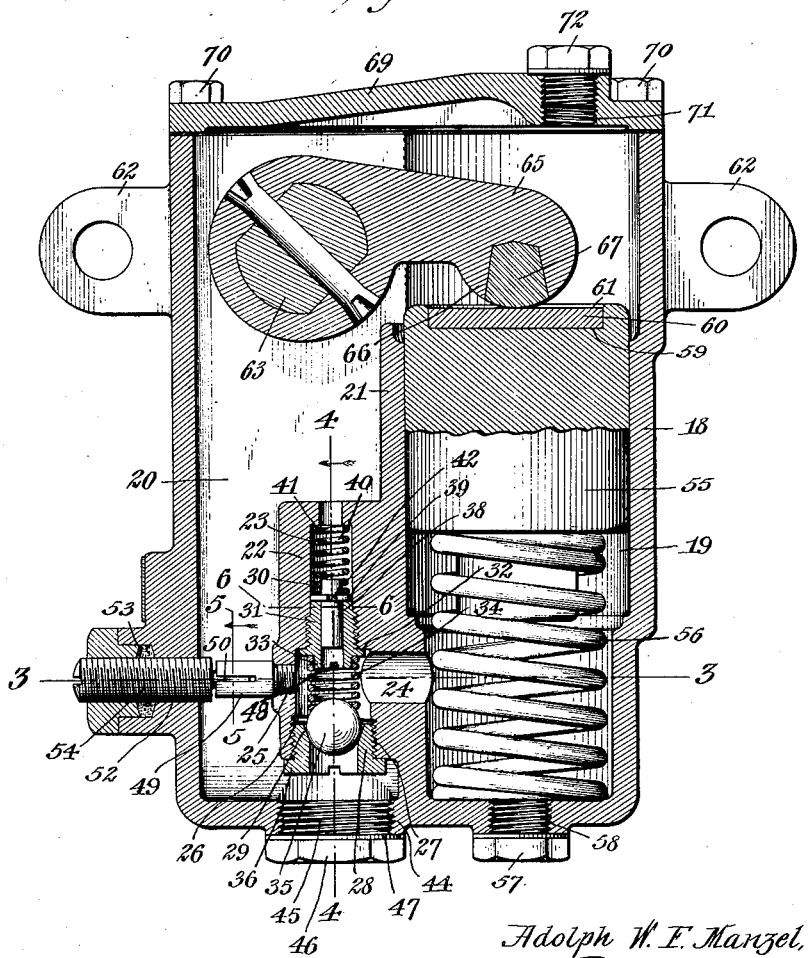
Fig. 2 is a central vertical longitudinal section through the shock absorber.

All of the parts within the control chamber are introduced thereinto from the bottom of said chamber, and to admit of this, the bottom of the oil-containing casing 18 is provided with a screw-threaded opening 44 of greater diameter than all of the parts fitted or placed into said control chamber, and as illustrated in Fig. 2, the part having greatest diameter or transverse dimension is the valve seat 28. This screw-threaded opening 44 is closed in an oil-tight manner by a screw plug 45 between the head 46 of which and the under side of the bottom wall of the casing 18 a washer 47 is interposed.

In assembling the parts within the control chamber the relief valve 38 is placed into the valve stem guide sleeve 31 from the upper end thereof, and the spring 40 mounted on the outstanding flange 39 of said valve. The three parts so assembled are introduced through the screw-threaded opening 44 in the bottom of the casing after removing the plug 45, and by means of a suitable tool engaging, for example, tool slots 48 in the lower end of the valve stem guide sleeve, the latter is threaded upwardly into the relief valve chamber 30 until the flange of said guide sleeve is in firm contact with the top wall of the main valve chamber 26.

With the parts constituting the relief valve mechanism in place, the spherical ball valve 35 is placed against the valve seat 28 and the compression spring 34 against the spherical or ball valve, and these three parts are then introduced through the screw-threaded opening 44 and the valve seat threaded into the lower threaded end of the valve chamber 26 until the outstanding flange 36 of said valve seat is in firm contact with the under side of the control chamber 22. When the parts are properly arranged, the upper end of the spring 34 will surround the depending flange 33 of the valve stem guide sleeve 31 and bear against the outwardly-extending flange 32 of said guide sleeve, while the lower end of said spring will be in firm contact with the spherical or ball valve 35 and keep the same firmly seated against the flared portion 29 of said valve seat.

The threaded opening 25 in the side of the control chamber has the reduced inner end of a control valve guide sleeve 49 threaded thereinto, said guide sleeve having an axial bore of even diameter throughout its length and having its cylindrical wall slotted, as at 50, the slots extending inwardly from the outer end of said guide sleeve and being preferably at diametrically opposite points. By reducing the inner end of said valve guide sleeve a shoulder 51 is provided which is brought in firm contact with the outer side of the control chamber when said guide sleeve is securely threaded into the opening 25, thus rendering the guide sleeve oil tight at this point.

In the outer edge wall of the oil chamber 20 a threaded opening 52 is formed, this opening being co-axial with the valve guide sleeve 49, and in connection with said opening a stuffing box 53 is provided. An adjustable control valve 54 is passed through said stuffing box and threaded through said opening 52, the inner end of said valve being reduced in diameter to enter the valve guide sleeve 49 from its outer end so as to cover or close the slots or passages 50 in said guide sleeve to any desired degree, depending on the adjustment made for said valve.

As clearly shown in Figs. 2 and 3, this valve is adjusted so that the inner end thereof terminates a very slight distance from the inner ends of the slots or passages 50 in the valve guide sleeve, thus providing very small openings through which oil may pass between the ends of said slots and the inner end of said valve.

Within the chamber or cylinder 19 a plunger or piston 55 is arranged for reciprocable movement, its lower end being reduced in diameter to form an abutment for the upper end of a comparatively powerful spiral spring 56, the upper portion of which surrounds the reduced portion of the plunger or piston, while the lower end thereof bears against the bottom wall of said chamber or cylinder.

The screw plug 45, while permitting the introduction of the certain parts within the control chamber, is also adapted for draining the oil chamber 20, and a screw plug 57 is threaded into a threaded opening 58 formed in the bottom wall of the chamber or cylinder 19 for the purpose of conveniently draining the same.

The upper face of said plunger or piston 55 is provided with a depression 59 in which is placed a hardened wear plate 60 somewhat thinner than the depth of said depression so that the upper surface of this wear plate is in a plane beneath the upper edge of the surrounding wall of said depressions. A comparatively shallow pocket 61 is therefore provided above this wear plate in which oil is retained.

Projecting from the casing 18 are securing lugs 62 by means of which the casing may be fastened to the frame or chassis of the vehicle, suitable bolts or other fastening means being provided for the purpose.

Extending transversely through the casing is a rock shaft 63, which is preferably integral with a crank or actuating lever 64 extending from one end of said shaft at right angles thereto, and substantially parallel with the frame or chassis of the automobile. That portion of the rock shaft positioned between the two-side walls of the casing 19 has an actuating arm 65 secured thereto, the outer end of which is provided with a rounded contact portion 66 into which is fitted a hardened wearing pin or other element 67 which rides in contact with the hardened wear plate 60 in the upper end of the piston or plunger 55. A strip of webbing or other flexible material 68 is secured at one end to the free end of said actuating lever 64, and it has its other end fastened to the axle 17 in any approved manner.

The top wall of the casing is preferably in the form of a removable cover 69 fastened to the body of the casing by means of bolts 70, or otherwise, and in this top wall is a filling opening 71 through which oil or other fluid, used within the casing, is to be poured, this filling opening being closed with a screw plug 72.

When the automobile to which the device is applied travels over uneven roads, passes over ruts, or strikes an obstruction, the chassis and body of the automobile will lower, due to its being supported by the springs 16, which become flexed; the result being that the casing moves downwardly with the body of the automobile and positions the actuating lever 64 at an angle to the horizontal. This causes the actuating arm 65 to assume a similar position, in which position the free end of said actuating arm more closely approaches the cover 69 of the casing. This allows the spring 56 in the cylinder or pump 19 to force the plunger or piston 55 upwardly, thereby creating suction within the lower portion of the cylinder, also within the oil passage 24 and the valve chamber 26; thus causing the spherical or ball valve 35 to be lifted from the valve seat 28 against the action of the compression spring 34. This results in oil being drawn upwardly from the bottom of the chamber 20 through the valve seat 28, valve chamber 26, oil passage 24, and into the chamber or cylinder 19. Under such action the fluid in the chamber 20 is lowered, and filling of the enlarged unoccupied portion of the cylinder 9, by reason of the elevation of the piston 55, takes place.

When the chassis and the body of the vehicle move upwardly on what is generally termed the "rebound", the casing 18 will move upwardly with the chassis or body, the free end of the actuating lever 64 being restrained from upward movement due to the fact that it is connected by the webbing 68 with the axle 17. This causes the actuating lever 64 to gradually assume a horizontal position, or a less inclined or angular position, and at times even an oppositely inclined or angular position, depending in the first instance on the position of such lever when the parts are normal. However, as shown in the drawings, the lever is substantially in horizontal position when the parts are normal and consequently after assuming a rearwardly inclined position when the body lowers and the spring is flexed, recovery of the body to normal position will return said lever to horizontal position, at which time the actuating arm will again assume the position shown in Fig. 2, having caused the plunger or piston 55 to be depressed against the force of the main spring 56. During the downward movement of the plunger or piston within its cylinder, oil within said cylinder is forced outwardly from the lower portion thereof into the valve chamber 26, and as the spherical or ball valve 35 was seated against its valve seat by the spring 34 the instant the piston reached the end of its upward movement, the oil forced into the valve chamber 26 by action of said plunger or piston will be compelled to find an outlet from the valve chamber 26 in some other direction, and for this purpose the adjustable control valve 54 and the guide sleeve 49 are provided, the oil passing into said guide sleeve and escaping through the small openings provided between the ends of the slots in said guide sleeve and the inner end of the reduced portion of said valve. These small openings are restricted to the required size through the adjustment of the control valve 54 within its guide sleeve, and as these openings are comparatively small, the oil escapes therethrough slowly and a slow recovery of the parts takes place without subjecting the occupants of the automobile to jar. This control valve 54 may be adjusted according to the weight carried by the springs of the automobile, but in all instances a slow escape of oil takes place so that the rebound of the body of the automobile is effectively checked and said body allowed to return gradually and slowly to normal position.

In the event that the valve-controlled openings in the guide sleeve 49 become clogged or the pressure within the valve chamber 26 becomes excessive, the oil within said chamber acts against the under side of the relief valve 38, which is lifted under the pressure exerted and unseats the outstanding flange 39 thereon from the upper end of the valve stem guide sleeve 31, and at the same time uncovers the lower ends of the slots 50 in said valve sleeve, during which action the compression spring 41 becomes compressed. This results in the oil under excess pressure being directed upwardly through the slots 50 of the valve stem guide sleeve, through the notches 42 in the flange 39 of the relief valve, and causes the oil to escape out into the chamber 20 from the upper end of the control chamber 22.

In Fig. 11, a modified form of relief valve, under the principle involved, is shown. In this instance the upper portion of the control chamber is only slightly decreased in diameter and a cylindrical valve casing 73 fitted thereinto, said valve casing being inserted from the bottom of the control chamber before positioning the valve seat 28, the spherical or ball valve 35, and the expansion spring 34 within the valve chamber 26. This valve casing 73 is provided with an axial bore 74 of two different diameters to form an upwardly-facing shoulder 75. The smaller portion of the bore, designated by the numeral 76, serves as a valve stem guide. and the larger portion 77 as a spring chamber.

In the preferred construction, best shown in Figs. 2 and 4, the stem of the relief valve is solid and the valve stem guide provided with oil passages adapted to be covered or uncovered by said solid valve stem, whereas in the modification shown in Fig. 11, the valve stem guide 76 of the cylindrical valve casing is devoid of oil passages and the relief valve designated, in this instance, by the numeral 78, is so constructed that when lifted by oil pressure from beneath, it will furnish the necessary oil passages. For this purpose, this relief valve has its stem 79 slidably fitted within the smaller portion of the bore or valve stem guide 76, and the upper portion of this stem is reduced in diameter, as at 80, at the upper end of which reduced portion an outstanding flange or head 81 is provided which bears against the upwardly-facing shoulder 75 formed in the bore 74 of the cylindrical valve casing.

Like the outstanding flange 39 of the auxiliary or safety valve 38 in the preferred construction, this flange or head 81 also has notches 82 at diametrically opposite points. The stem of this auxiliary or safety valve 78 extends downwardly into the valve chamber 26, and at diametrically opposite points has grooves 83 formed longitudinally therein, each of these grooves being deepened from their upper ends downwardly to the lower end of the valve stem, as best shown in Figs. 12 and 14.

Within the larger portion or spring chamber 77 of the cylindrical valve casing 73, is a compression spring 84, which bears at its upper end against the top wall of the control chamber 22, and at its lower end against the top of the relief valve 78, or more particularly against the upper face of the head 81 of said valve. This modified form of relief valve mechanism operates as follows:

When for any reason the escape openings in the valve guide sleeve 49 become clogged, or the pressure within the valve chamber 26 becomes excessive, or in other words, when the pressure becomes greater than allowed for by the retarded escape of the oil through the valve guide sleeve 49, the oil within said chamber 26 exerts its pressure upwardly against the lower end of the relief valve 78, with the result that this valve is lifted against the action of the compression spring 84. The oil, of course, is forced upwardly into the grooves at opposite sides of the stem of this valve, and when said valve is raised to bring the upper ends of the grooves above the upwardly facing shoulder 75, the oil will pass into the spring chamber 77, escaping upwardly through the notches 82 formed in the head of said valve and thence out through the top of the control chamber 22. It is, of course, understood that the portion of the relief valve chamber 30 in the preferred construction, which may also be termed a spring chamber, and the spring chamber 77 in the modified construction, will be filled with oil so that the exact quantity of oil forced into these spring chambers from the bottom thereof will be displaced at the upper end of the control chamber and will be delivered into the oil chamber 20.

Having thus described my invention, what I claim is:—

1. A shock absorber, comprising a casing having an oil-containing chamber and a cylinder, a valve-controlled chamber within said oil-containing chamber at one side of said cylinder, a plunger within said cylinder, a spring-pressed valve within said valve-controlled chamber normally closed to prevent the admission of oil into said valve-controlled chamber from said oil chamber and the escape of oil from said cylinder into said oil-containing chamber during the pressure stroke of said plunger, said valve opening to admit oil from said oil-containing chamber to said cylinder during the suction stroke of said plunger, and a definitely restricted oil passage leading from said valve-controlled chamber to said oil-containing chamber and allowing the passage of fluid therethrough under impeded flow during the pressure stroke of said piston.

2. In a shock absorber, comprising an oil-containing chamber, a cylinder, a valve-chamber between the oil-containing chamber and said cylinder, a plunger within said cylinder, a passage leading from said cylinder to said oil-containing chamber and having a definitely restricted oil passage opening into said oil-containing chamber to provide impeded flow of oil from said cylinder to said oil-containing chamber during the pressure stroke of said plunger, a valve within said valve-chamber to allow a free flow of oil from said oil-containing chamber to said cylinder during the suction stroke of said plunger, and means in communication with said valve-chamber serving as a relief to allow the passage of oil from said cylinder to said oil-containing chamber when pressure created by said plunger becomes excessive.

3. A shock absorber, comprising a casing adapted to be secured to one of two relatively movable parts and having an oil-containing chamber and a cylinder provided with an extension projecting into said oil-containing chamber and spaced from the bottom thereof, a valve chamber in said extension, a passage leading from said valve chamber to said cylinder, a definitely restricted passage leading from said valve chamber to said oil-containing chamber, an inlet for said valve chamber opening through the bottom of said extension into said oil-containing chamber, a spring-pressed valve closing said inlet, a relief passage connecting said valve chamber with said oil chamber, a spring-controlled relief valve within said relief passage, a plunger within said cylinder, a spring effecting the suction stroke of said plunger, an actuator effecting the pressure stroke of said plunger, and means connected with said actuator adapted to be connected to the other of said two relatively movable parts.

4. In a shock absorber, an oil-containing chamber and a cylinder, a plunger within said cylinder, a valve normally closed and allowing the free flow of oil from said oil-containing chamber to said cylinder, and a controlled oil escape comprising a sleeve having one end in connection with said cylinder and being provided in its wall with a longitudinally-elongated opening and an adjustable control valve fitting into the opposite end of said sleeve and providing a definitely restricted passage in said longitudinally-elongated opening for the impeded passage of oil from said cylinder to said oil-containing chamber during the pressure stroke of said piston.

5. In a shock absorber, two oil-containing chambers, a control device providing for the impeded flow of oil from one of said chambers to the other, comprising a sleeve-like element having one end opening to one of said chambers and projecting into the other chamber, the projecting portion having slots at diametrically opposite points extending from the projecting end of said sleeve inwardly, and an element fitted into said sleeve from said projecting end and terminating a distance from the inner ends of said slots to provide restricted oil passages in said sleeve.

6. A shock absorber, comprising a casing having an oil-containing chamber and a cylinder, a plunger within said cylinder, a valve-controlled passage leading from said oil-containing chamber to said cylinder, a sleeve-like element screw-threaded with one end into the wall between said oil-containing chamber and said cylinder, said sleeve-like element having its inner end connected with said valve-controlled passage between the valve thereof and said cylinder and extending into said oil-containing chamber, said sleeve-like element having an elongated longitudinally-disposed opening therein, and an adjustable valve fitting into the extending portion of said sleeve-like element and terminating within the latter a definitely spaced distance from the inner end of said opening, said adjustable valve being adjustable lengthwise within said sleeve-like element from the exterior of said casing.

7. A shock absorber, comprising a casing having an oil-containing chamber and a cylinder separated by a wall provided with a portion extending into said oil chamber and serving as a control chamber, a plunger within said cylinder, said control chamber having its lower end spaced from the bottom of said oil-containing chamber and having a valve chamber in its lower portion, a passage connecting said valve chamber with said cylinder, an inlet at the bottom of said valve chamber connecting the latter with said oil-containing chamber, a spring-controlled valve within said valve chamber closing said inlet, a valve-controlled relief passage extending from said valve chamber to the upper end of said control chamber, a sleeve-like element threaded into the wall of said valve chamber in line with the passage between the latter and said cylinder and having its inner end opening into said valve chamber and its outer portion projecting into said oil-containing chamber and provided with diametrically opposite slots opening from the outer end thereof inwardly, a stuffing box in the wall of said casing alined with said sleeve-like element, an adjusting valve threaded through said stuffing box and having an unthreaded cylindrical portion at its inner end fitted into said sleeve-like element and terminating at any definitely fixed point with respect to the inner ends of said slots.

8. A relief device for a shock absorber, comprising a passage having a plurality of different diameters providing oppositely-disposed shoulders within said passage, a relief valve having a body portion and an outstanding flange provided with a notch and bearing against one of said shoulders, a spring within said passage bearing at one end against the other of said shoulders and at its other end against said outstanding flange, and means embodied in the construction of said device providing oil escape openings through said passage enlarged in proportion to the action of said valve against the pressure of said spring.

9. In a shock absorber, an oil-containing chamber, a cylinder, a plunger within said cylinder and a control chamber between said oil-containing chamber and said cylinder, said control chamber having a passage therethrough restricted at its outer end to form an inwardly-facing shoulder and screw-threaded at its inner end, a valve-stem guide-sleeve screw-threaded into the inner end of said passage, a valve having a cylindrical portion fitted into said guide sleeve and having an outstanding flange provided with an opening therethrough, a spring bearing at one end against said inwardly-facing shoulder and at its other end against said flange, and cooperating means between said valve and said guide sleeve whereby an oil passage is provided between the two when said valve is moved outwardly a predetermined distance against the action of said spring, said oil passage being gradually enlarged to increase the capacity thereof in proportion to the movement of said valve outwardly against the action of said spring.

10. In a shock absorber, a relief device comprising a passage restricted at one end to provide an inwardly-facing shoulder and having its other end screw-threaded, a valve stem guide sleeve threaded into the screw-threaded end of said passage and having a slot extending from its outer end inwardly, a cylindrical valve fitted into said guide sleeve and having an outstanding flange bearing against the outer end thereof to close the outer end of said slot, said flange having an opening therethrough, said valve normally covering said slot, and a spring acting against said valve to keep said flange in contact with the outer end of said guide sleeve, said valve being adapted to be moved against the action of said spring to uncover said slot in proportion to the range of movement of said valve.

11. A shock absorber, comprising a casing having an oil-containing chamber, a cylinder, and a wall separating said chamber from said cylinder and provided with an extension projecting into said oil-containing chamber and serving as a control chamber for controlling the flow of fluid from and to said oil-containing chamber, said control chamber having a longitudinal passage therethrough reduced in diameter along its upper portion and threaded at its lower portion, a valve seat threaded into said threaded lower portion, a transverse passage connecting the larger portion of said longitudinal passage with said cylinder, a relief valve in the smaller portion of said longitudinal passage, a valve seated against said valve seat, a spring tending to hold said valve against said valve seat, and means connecting the larger portion of said longitudinal passage with said oil-containing chamber including a sleeve-like member extending into said oil-containing chamber and opening with one end into said longitudinal passage, said sleeve-like member having slots at diametrically opposite points extending inwardly from the outer end thereof, and an adjustable valve extending from the exterior of said casing into said sleeve-like member and uncovering definitely determined portions of said slots at the inner end thereof to provide restricted oil passages through said sleeve-like member.

12. A shock absorber, comprising a casing having an oil-containing chamber and a cylinder, a plunger within said cylinder, a valve-controlled passage leading from said oil-containing chamber to said cylinder, a sleeve-like element screw-threaded with one end into the wall between said oil-containing chamber and said cylinder, said sleeve-like element having its inner end connected with said valve-controlled passage between the valve thereof and said cylinder and extending into said oil-containing chamber, said sleeve-like element having also an elongated longitudinally-disposed opening in its wall, and a valve fitting into the extending portion of said sleeve-like element and terminating within the latter a definitely spaced distance from the inner end of said opening.

In testimony whereof I affix my signature.

ADOLPH W. F. MANZEL.